United States Patent [19]

McGinn et al.

[11] Patent Number: 4,581,512

[45] Date of Patent: Apr. 8, 1986

[54] METHOD AND APPARATUS FOR COOLING INDUCTION HEATED MATERIAL

[75] Inventors: Kevin S. McGinn, Phoenixville; Klaus A. Burckhardt, Spring City, both of Pa.; Werner Buecker, Kaarst, Fed. Rep. of Germany

[73] Assignee: MG Industries, Inc., Valley Forge, Pa.

[21] Appl. No.: 629,362

[22] Filed: Jul. 10, 1984

[51] Int. Cl.$^4$ .............................................. H05B 5/00
[52] U.S. Cl. ........................... 219/10.49 R; 219/10.41; 219/10.51; 165/75; 165/104.13
[58] Field of Search ...................... 219/10.41, 10.49 R, 219/10.51, 10.43, 137.62; 165/96, 154, 104.13, 104.14, 104.33, 134 R, 104.19, 65, 75; 148/16.6, 16.7, 135

[56] References Cited

U.S. PATENT DOCUMENTS

| | | | |
|---|---|---|---|
| 1,905,809 | 4/1933 | Cowan | 148/16.7 |
| 1,905,810 | 4/1933 | Cowan et al. | 148/16.7 |
| 1,944,743 | 1/1934 | Kelley | 148/16.7 |
| 2,452,915 | 11/1948 | Feild | 148/16.6 |
| 3,223,819 | 12/1965 | Witteman | 219/137.62 X |
| 3,347,716 | 10/1967 | Evans | 148/16.7 |
| 3,493,041 | 3/1970 | Hourwitz et al. | 165/154 |
| 3,529,126 | 9/1970 | Reeh | 219/137.62 |
| 4,154,629 | 5/1979 | Asai et al. | 148/16.7 |
| 4,163,470 | 8/1979 | Johnsen et al. | 165/96 X |
| 4,215,259 | 7/1980 | Rudd et al. | 219/10.43 |

*Primary Examiner*—C. L. Albritton
*Assistant Examiner*—M. N. Lateef
*Attorney, Agent, or Firm*—John F. A. Earley; John F. A. Earley, III

[57] ABSTRACT

A method and apparatus for the induction heating of a metallic material comprising the steps of forming the material into a desired shape, passing the formed material in heat exchange relationship with an induction heating means, passing the heated material directly from the induction heating means into the reaction chamber of a cooling shroud at a temperature above its lowest reaction temperature, delivering hydrogen gas and an inert gas into the reaction chamber of the cooling shroud to expose the material entering the reaction chamber to this gas mixture so as to reduce the surface oxidation on the material, cooling the material in the reaction chamber while exposing the surface thereof to the inert gas, and passing the material from the cooling shroud at a reduced temperature which is less than the reaction temperature of the material whereby the formation of heavy surface oxides is eliminated and the material has a workable hardness.

13 Claims, 2 Drawing Figures

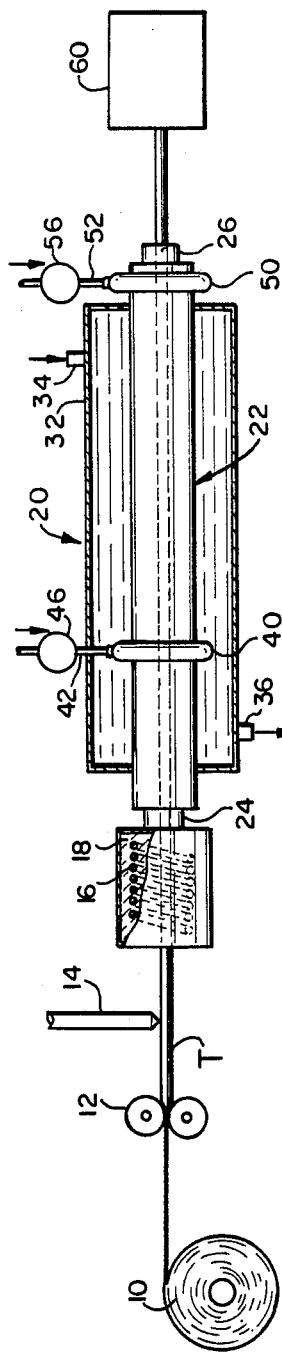
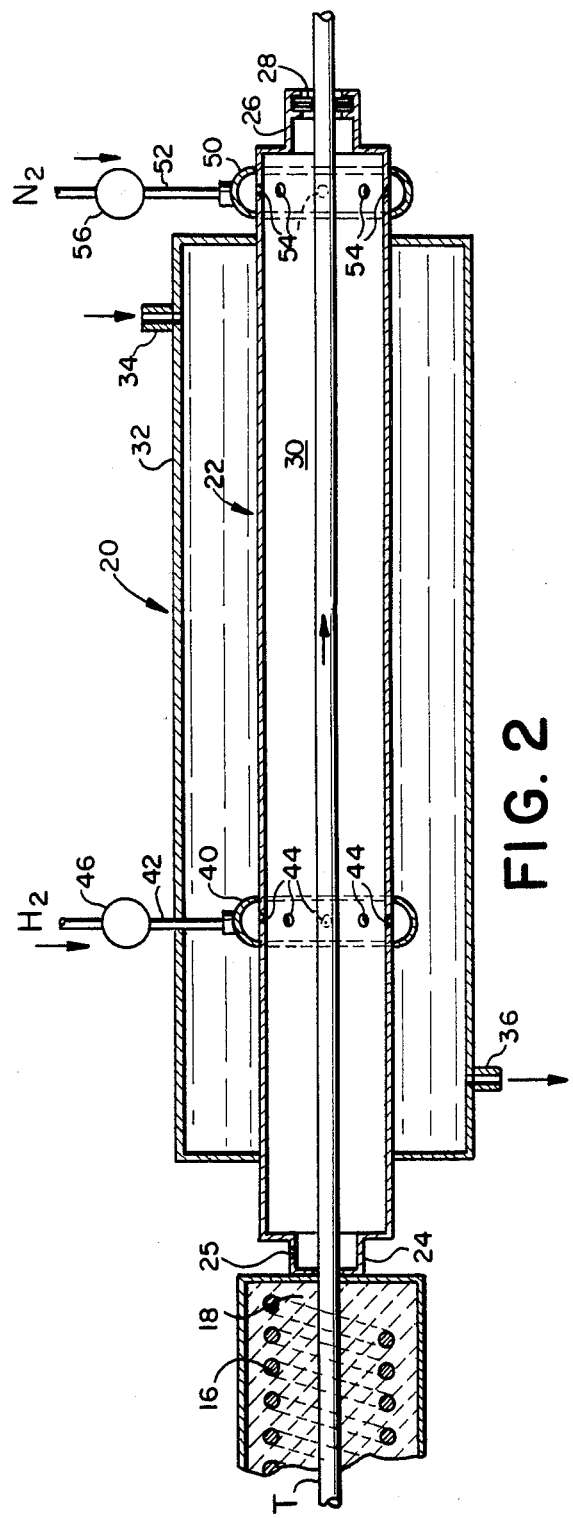

METHOD AND APPARATUS FOR COOLING INDUCTION HEATED MATERIAL

FIELD OF THE INVENTION

This invention relates to the field of induction heating and, more particularly, it relates to a method and apparatus for the cooling of induction heated material.

BACKGROUND OF THE INVENTION

In the continuous induction heating processes in use today a tube or billet material is passed through an induction coil and heated to a temperature above its critical reaction temperature and then introduced into a highly oxidizing atmosphere. For example, after passing from the induction heating coil, the material is introduced to a highly oxidizing atmosphere of air and is passed through a water spray where it is cooled to a temperature in preparation for passage to a cut-off station. Thus, the induction heated material is cooled in an oxidizing environment and upon completion of the induction heating process, the materials are cleaned by means of several processes, including acid cleaning (pickling), sand blasting, buffing and shot, and grinding, polishing, etc.

The prior art induction heating processes are faced with two drawbacks. Firstly, the material produced has a dull finish and requires additional steps to eliminate the surface oxidation. Secondly, the material produced by the prior art processes have a relatively high hardness making them less workable.

It is known to subject metals to a reducing atmosphere during a controlled cooling down step in a process such as annealing. Exemplary of this prior art are the disclosures in U.S. Pat. Nos. 1,091,039; 1,905,810; 1,944,743; 2,452,915; 2,703,298; 3,171,759; 3,826,693; and 4,154,629.

SUMMARY OF THE INVENTION

It is an object of the present invention to provide a method for cooling material heated in an induction heating process in a manner to eliminate the formation of heavy surface oxides and to improve the workable hardness of the material.

It is an object of the invention to provide a cooling shroud for use in the cooling of induction heated material in a manner such as to eliminate the formation of heavy surface oxides and to improve the workable hardness of the material.

The objects of this invention are accomplished by providing a cooling shroud in accordance with the invention in a continuous induction heating process adjacent to the induction heater so that the material being processed passes directly from the induction heater through the cooling shroud. There is provided a flow control system for introducing a blended atmosphere of hydrogen and an inert gas to the shroud's internal reaction chamber. The process is controlled so that the hydrogen reacts with the induction heated material which enters the reaction chamber at a temperature above its lowest "reaction temperature" whereby hydrogen reacts therewith to effect the reduction of surface oxides after which the material is cooled in a continuous inert atmosphere until the material is below its reaction temperature.

As used herein, "reaction temperature" is defined as that temperature where the metal being processed reacts with hydrogen to reduce surface oxidation. By using the method and apparatus of the invention to cool induction heated stainless steel tubes, there has been produced material with a bright finish and a more workable hardness than with comparable prior art methods.

BRIEF DESCRIPTION OF THE DRAWINGS

FIG. 1 is a schematic view of an induction heating process illustrating the method of the invention.

FIG. 2 is a sectional view showing a cooling shroud in accordance with the invention.

DETAILED DESCRIPTION OF THE INVENTION

In FIG. 1 there is shown an induction heating process incorporating the novel shroud cooling system of the invention. As shown in this Figure, there is provided a flat stock feeder 10 wherein a coil of a material, such as stainless steel or other metallic materials to be processed, is mounted to be fed to a former 12. The former 12 is typically provided with rounding dies which bend and form the flat stock into a desired shape, such as a round tube "T" as is the case in the present disclosure. The tube is then fed to a welder 14 which bonds the formed tube together to provide a watertight joint. From the welder 14, the tube T is fed to an induction heating coil 16 which is conventional and has the tube T fed through the interior thereof in heat exchange relationship therewith. Typically, the induction heating coil 16 operates to increase the temperature of the material to that required for the full annealing thereof. Pursuant to the invention, the induction heating coil 16 is mounted in a non-conductive refractory casing 18 and is butted up against the novel cooling shroud unit 20 in accordance with the invention as is best shown in FIG. 2.

The cooling shroud unit 20 is shown in detail in FIG. 2 and comprises an elongated reaction tube 22 having cap 24 at the entrance end thereof butted up against the refractory casing 18 of the induction coil 16. Reaction tube 22 is mounted as shown in FIG. 2 to receive the tube T, which is fed therethrough in the direction shown by the arrow in this Figure. At its exit end, reaction tube 22 has a reducer 26 made of stainless steel and is provided with refractory packing 28 for closing the tube 22. The cap 24 at the entrance end of the reactor tube 22 is provided with an opening to permit the passage of the induction heated tube T into the interior of reactor tube 22, and the packing 28 at the exit end of the reaction tube 22 is provided with an opening to permit the passage of the tube T out of the interior of reaction tube 22. The space defined within reaction tube 22, end cap 24 and reducer 26 serves as a reaction chamber 30 for the unit 20.

A cylindrical water jacket 32 is mounted around the exterior of the reaction tube 32 and is provided with an inlet 34 and an outlet 36 for circulating a flow of water for use in cooling the outer surface of reaction tube 22 to control the temperature of the tube T passing therethrough.

Means are provided for introducing hydrogen gas into the reaction chamber 30. Such means comprises a ring manifold 40 having hydrogen gas supplied thereto through a supply line 42. A plurality of flow passages 44 are formed in the reaction tube 22 in circumferentially spaced relation and are aligned with the ring manifold 40 for the delivery of hydrogen gas into reaction chamber 30 in a direction directed towards the entrance end of the reaction chamber 30. To this end, flow passages 44 extend at a 45° angle to the axis of reaction tube 22.

There is also provided means for delivering an inert gas (i.e., nitrogen) into the reaction chamber 30. Such means comprises a ring manifold 50 extending around the reaction tube 22 near the exit end thereof and a line 52 for supplying nitrogen gas to the ring manifold 50. There is provided a plurality of flow passages 54 formed in the reaction tube 22 in circumferentially spaced relation and aligned with the ring manifold 50 and arranged to direct the nitrogen gas into the reaction chamber 30 in a direction toward the entrance end thereof. To this end, flow passages 54 extend at a 45° angle to the axis of reaction tube 22.

The end cap 24 is provided with a passage 25 to allow gas to be discharged from the entrance end of reaction chamber 30 for burn-off purposes.

A flow control means 46 is provided in hydrogen feed line 42 for controlling the flow of the hydrogen gas to the reaction chamber 30. Typically, the flow control means 46 delivers the hydrogen gas at 70° F. and 30 PSIG.

A flow control means 56 is provided in nitrogen feed line 52 for controlling the flow of nitrogen gas to the reaction chamber 30. Typically, the control means 56 delivers the nitrogen gas at 70° F. and 30 PSIG.

Typically, the control means 46 and 56 operate to control the flow rates of hydrogen and nitrogen so that there are approximately five volume changes to the total volume of the reaction chamber 30 for each length of material treated. The ratio of the gas mixture of hydrogen and nitrogen varies with the type of material being processed. Moreover, the flow of nitrogen is maintained at a volume to keep the outside air from entering the reaction chamber 30 of the cooling shroud.

As is shown in FIG. 2, the hydrogen gas is introduced at a forward location and is directed toward the entrance end of the reaction chamber 30 and the nitrogen is introduced at a location at the exit end of the reaction chamber 30 and is directed toward the entrance end thereof. By this arrangement, as the material being treated moves through the reaction chamber 30, it is first exposed to contact with a gas mixture having a high hydrogen content whereby, since the material is above its lowest reaction temperature, the hydrogen effects the reduction of the oxides on the surface of the material. As the material continues its movement through the reaction chamber 30 it is then exposed to contact with a gas mixture comprised almost entirely of the inert gas nitrogen until the material exits the reaction chamber 30. The material is cooled down while in this inert atmosphere by the cooling effected of the water jacket 32 of shroud unit 20.

The cooling action of the water jacket 32 is controlled such as to maintain the temperature within the reaction chamber 30 at a level to cool down the tube T so that the temperature of the tube T when it leaves the reaction chamber 30 is below the "reaction temperature" for the material being treated. Typically, a tube enters cooling shroud unit 20 at about 2100° F. and leaves the shroud at approximately 100° F. to 120° F.

From the cooling shroud unit 20, the tube T passes to an automatic cut-off saw 60 which operates to cut the tube into desired lengths, such as 10 feet or 20 feet.

In actual practice, the method and apparatus of the invention has been used to eliminate surface oxidation of stainless steel tubes so as to provide a bright finish. Moreover, the actual use of the method of the invention has produced stainless steel tubes having a workable hardness of RB-62-64 whereas a comparable prior art method produced stainless steel tubes having a hardness of RB-72-78 which is harder and less workable.

We claim:

1. A method for the induction heating of a metallic material comprising the steps of:
   forming the material into a desired shape,
   passing the formed material in heat exchange relationship with an induction heating means,
   passing the heated material directly from the induction heating means into the reaction chamber of a cooling shroud at a temperature above its lowest reaction temperature,
   delivering hydrogen gas and an inert gas into the reaction chamber of the cooling shroud to expose the material entering the reaction chamber to this gas mixture so as to reduce the surface oxidation on the material,
   cooling the material in the reaction chamber while exposing the surface thereof to the inert gas, and
   passing the material from the cooling shroud at a reduced temperature which is less than the reaction temperature of the material whereby the formation of heavy surface oxides is eliminated and the material has a workable hardness.

2. The method according to claim 1 wherein the hydrogen gas is introduced at a forward location toward the entrance end of the cooling shroud and the inert gas introduced at a location near the exit of the cooling shroud.

3. The method according to claim 2 wherein said inert gas is nitrogen.

4. The method according to claim 1 wherein said inert gas is maintained at a volume to keep outside air from entering the reaction chamber of the cooling shroud.

5. The method according to claim 1 wherein a cooling liquid is passed over the exterior of the cooling shroud for cooling the same so as to assist the cooling of the induction heated material in the reaction chamber.

6. A cooling shroud for use in an induction heating process for cooling induction heated material comprising:
   a shroud comprised of an elongated reaction chamber internally thereof adapted to have the induction heated material pass therethrough from an entrance end to an exit end,
   means for introducing hydrogen into said reaction chamber at a location near the entrance end thereof, and
   means for introducing an inert gas into said reaction chamber at a location near the exit end thereof.

7. A cooling shroud according to claim 6 including a water jacket enclosing said shroud and means for circulating cooling liquid through said jacket so as to maintain a desired temperature of the material in said reaction chamber.

8. The cooling shroud according to claim 6 wherein said hydrogen gas is introduced into said reaction chamber in a direction toward the entrance end thereof.

9. The cooling shroud according to claim 8 wherein the inert gas is introduced into said reaction chamber in a direction toward the entrance end thereof.

10. The cooling shroud according to claim 7 wherein said circulating cooling liquid and said gas flows are maintained under conditions such that the material exiting said shroud is at a temperature at which oxygen, air or water does not react with the surface of the material to oxidize the same.

11. The cooling shroud according to claim 7 wherein the temperature and flow rate of said gases and said cooling liquid are such that the material being processed is maintained at a temperature at the entrance of the reaction chamber whereby the hydrogen reacts therewith to reduce the surface oxidation thereof.

12. A method for the induction heating of a metallic material comprising the steps of:
   forming the material into a desired shape,
   passing the formed material in heat exchange relationship with an induction heating means,
   passing the heated material directly from the induction heating means into the reaction chamber of a cooling shroud at a temperature above its lowest reaction temperature,
   delivering hydrogen gas and an inert gas into the reaction chamber of the cooling shroud to expose the material entering the reaction chamber to this gas mixture so as to reduce the surface oxidation on the material,
   cooling the material in the reaction chamber while exposing the surface thereof to the inert gas, and
   passing the material from the cooling shroud at a reduced temperature which is less than the reaction temperature of the material whereby the formation of heavy surface oxides is eliminated and the material has a workable hardness,
   wherein the hydrogen gas is introduced at a foward location toward the entrance end of the cooling shroud and the inert gas introduced at a location near the exit of the cooling shroud,
   wherein said inert gas is nitrogen,
   wherein said inert gas is maintained at a volume to keep outside air from entering the reaction chamber of the cooling shroud,
   wherein a cooling liquid is passed over the exterior of the cooling shroud for cooling the same so as to assist the cooling of the induction heated material in the reaction chamber.

13. A cooling shroud for use in an induction heating process for cooling induction heated material comprising:
   a shroud comprised of an elongated reaction chamber internally thereof adapted to have the induction heated material pass therethrough from an entrance end to an exit end,
   means for introducing hydrogen gas into said reaction chamber at a location near the entrance end thereof,
   means for introducing an inert gas at higher than atmospheric pressure into said reaction chamber at a location near the exit end thereof,
   a water jacket enclosing said shroud and means for circulating cooling liquid through said jacket so as to maintain a desired temperature of the material in said reaction chamber,
   wherein said hydrogen gas is introduced into said reaction chamber in a direction toward the entrance end thereof,
   wherein the inert gas is introduced into said reaction chamber in a direction toward the entrance end thereof to form a turbulent and homogenous mixture,
   wherein said circulating cooling liquid and said gas flows are maintained under conditions such that the material exiting said shroud is at a temperature at which oxygen, air or water does not react with the surface of the material to oxidize the same,
   wherein the temperature and flow rate of said gases and said cooling liquid are such that the material being processed is maintained at a temperature at the entrance of the reaction chamber whereby the hydrogen reacts therewith to reduce the surface oxidation thereof.

* * * * *